United States Patent [19]

Howell

[11] 4,378,040
[45] Mar. 29, 1983

[54] AUXILIARY TRACTION DEVICE FOR TIRES AND CABLE END CONNECTOR THEREFOR

[76] Inventor: Verle L. Howell, 4841 W. 69th Ave., Westminster, Colo. 80030

[21] Appl. No.: 273,762

[22] Filed: Jun. 15, 1981

[51] Int. Cl.³ .............................................. B60C 27/00
[52] U.S. Cl. ............................ 152/213 A; 24/68 TT; 24/115 M; 24/299; 152/219; 152/221; 152/242; 152/243
[58] Field of Search ............. 156/213 R, 213 A, 214, 156/221, 222, 219, 239–244; 24/68 CD, 68 CT, 68 TT, 299, 374, 115 M, 116 A, 136 K, 265 H, 265 CD, 136 L

[56] References Cited

U.S. PATENT DOCUMENTS

| | | | |
|---|---|---|---|
| 1,267,544 | 5/1918 | Haubner | 152/208 |
| 1,273,930 | 7/1918 | Scherer et al. | 152/232 |
| 1,297,155 | 3/1919 | Harrington | 152/221 |
| 1,311,971 | 8/1919 | Johnson | 152/208 |
| 1,324,069 | 12/1919 | Salembier | 152/208 |
| 1,350,484 | 8/1920 | Bailey | 152/221 |
| 1,581,722 | 4/1926 | DelValle | 152/240 |
| 1,644,077 | 10/1927 | Nesbitt | 152/222 |
| 1,829,859 | 11/1931 | Helgeson | 152/240 |
| 2,046,488 | 7/1936 | Roth | 152/242 X |
| 2,061,870 | 11/1936 | Gould | 24/170 |
| 2,346,477 | 4/1944 | Ederer | 152/221 |
| 2,528,203 | 10/1950 | Zwosta | 152/233 |
| 2,714,914 | 8/1955 | Champigny | 152/222 |
| 2,740,449 | 4/1956 | Erving | 152/239 |
| 2,791,257 | 5/1957 | Jacobson et al. | 152/244 |
| 3,025,901 | 3/1962 | Bengert | 152/239 |
| 3,192,983 | 7/1965 | Dalton et al. | 152/221 |
| 3,316,979 | 5/1967 | Dedoes | 172/22 |
| 3,426,824 | 2/1969 | Mazzela | 152/242 |
| 3,683,990 | 8/1972 | Detwiler | 152/225 |
| 3,752,204 | 8/1973 | Oullette | 152/219 |
| 3,762,457 | 10/1973 | Guethle | 152/239 |
| 3,913,651 | 10/1975 | Stoneck | 152/213 |
| 3,918,505 | 11/1975 | Müller | 152/243 |
| 3,934,633 | 1/1976 | Bula | 152/221 |
| 3,939,891 | 2/1976 | Barnett et al. | 152/225 |
| 4,055,210 | 10/1977 | Mongault | 152/239 |
| 4,146,076 | 3/1979 | Matsui | 152/221 |
| 4,155,389 | 5/1979 | Dwinell | 152/221 |
| 4,165,774 | 8/1979 | Matsui | 152/221 |
| 4,185,674 | 1/1980 | Giannone | 152/218 |
| 4,263,954 | 4/1981 | Dwinell | 152/222 |

FOREIGN PATENT DOCUMENTS

| | | |
|---|---|---|
| 1001615 | 1/1957 | Fed. Rep. of Germany . |
| 1213039 | 10/1959 | France . |
| 352918 | 3/1961 | Switzerland . |
| 1444045 | 7/1976 | United Kingdom . |

Primary Examiner—William A. Powell
Assistant Examiner—Thomas Bokan
Attorney, Agent, or Firm—John E. Reilly

[57] ABSTRACT

A novel and improved traction device comprises a cable-type chain adapted to be mounted on radial tires for emergency use wherein a pair of lateral cables are adapted to extend cicumferentially along opposite sidewalls of the tire. A plurality of cross-members are arranged at spaced intervals transversely of and between lateral cables to which opposite ends of each of the cross members are connected. Each of the cross members is in the form of an elongated flexible member composed of a wire or wire-like material with an outer plastic coating in surrounding relation to the elongated flexible member. At least one sleeve member is slidably disposed in outer surrounding relation to each of the cross members, the sleeve members being composed of a high impact-resistant material in the form of a plurality of extruded tubular sections of limited length disposed in end-to-end relation to one another for extension along the length of each cross member.

22 Claims, 8 Drawing Figures

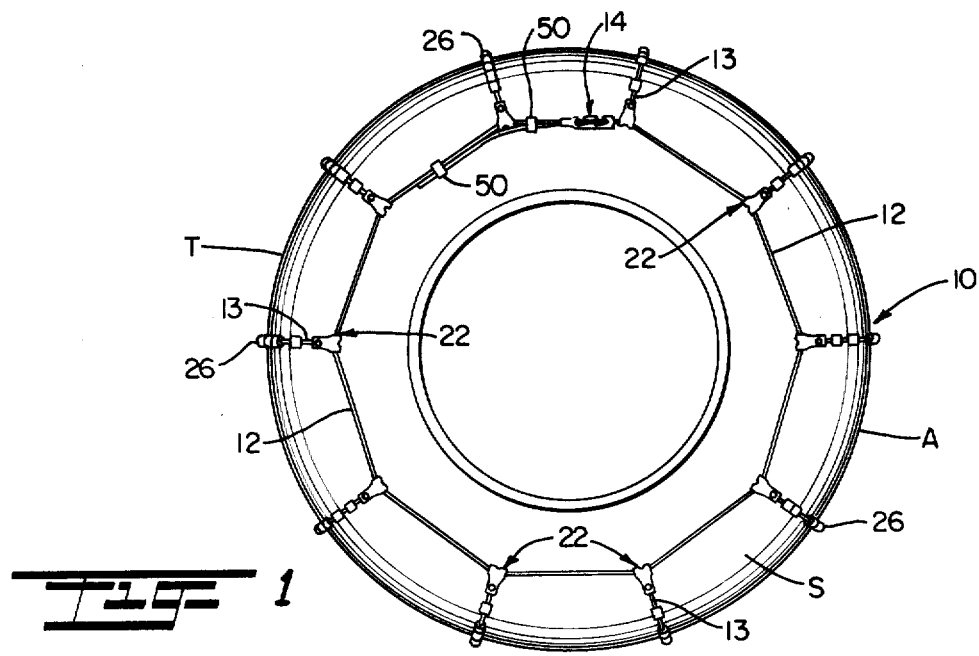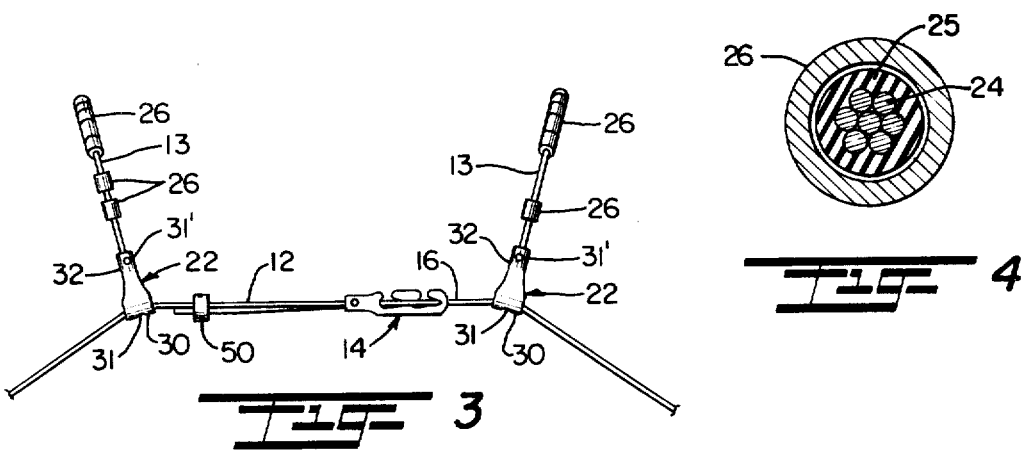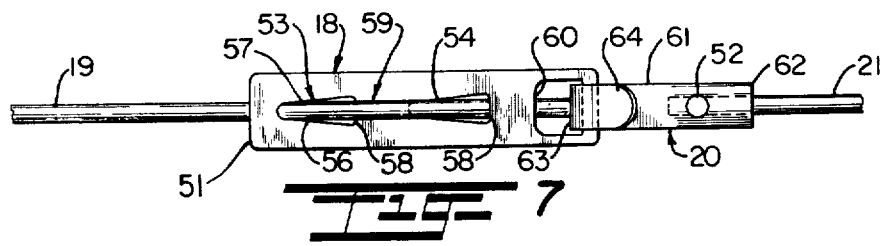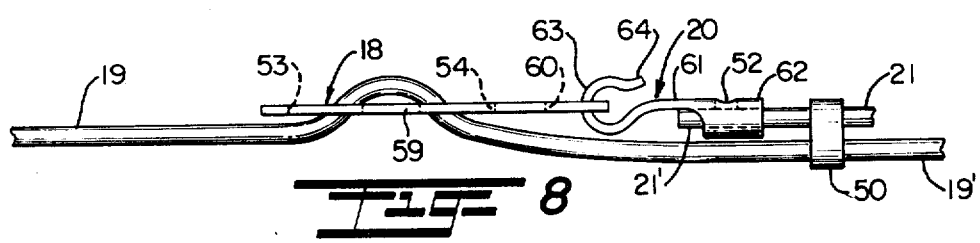

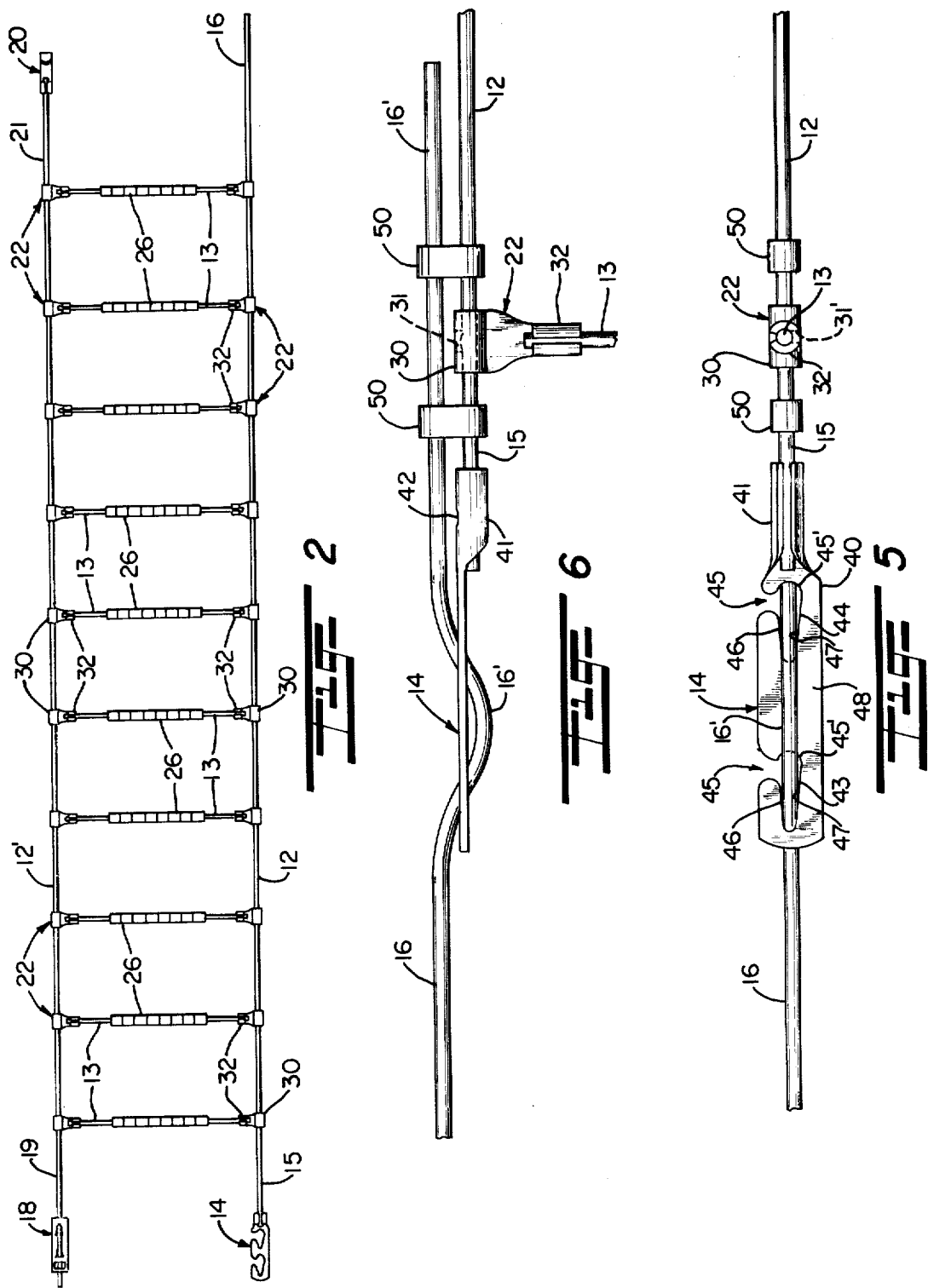

AUXILIARY TRACTION DEVICE FOR TIRES AND CABLE END CONNECTOR THEREFOR

This invention relates to traction devices for tires, such as, traction devices of the type commonly referred to as tire chains, and more particularly relates to cable type of traction devices for radial tires together with novel and improved forms of cable end connectors therefor.

BACKGROUND AND FIELD OF THE INVENTION

Conventional tire chains which are used for bias laid tires have not proven to be satisfactory for radial tires. Consequently, a number of approaches have been taken to the design and development of a workable traction device for radial tires. The most successful efforts have been directed to the design and construction of a cable type of tire chain in which the cross members are formed of steel wires or cables arranged at uniformly spaced intervals around the tread portion of the tire with each cross member connected at opposite ends to lateral or circumferentially extending cables which are adapted to extend along opposite sidewalls of the tire. Nevertheless, the cable type of chain has not found complete acceptance due to its relatively low wear-resistance, lack of good traction under certain road conditions, and a tendency to develop undue frictional resistance with the tire surface coupled with accompanying heat build-up and wear not only on the tire but on the cable members themselves. Efforts to solve this problem have involved the use of a combination of cable-type cross members and sleeves of limited length wherein a series of short sleeves are slidably disposed along the length of each cross member. Typical arrangements of this type are disclosed in U.S. Pat. Nos. 3,752,204 to Ouelette and 4,155,389 to Dwinell. In U.S. Pat. No. 3,752,204 a series of steel sleeves are mounted on a steel cable, the sleeves being in the form of full cylindrical tubes which are arranged to extend substantially the entire length of the cross member. In U.S. Pat. No. 4,155,389 the sleeves are partially split so as to permit the formation of sharpened edges capable of biting into the ice in order to develop greater traction, the sleeves being separated from the wire cable by a helically wound wire. Other representative approaches are disclosed in U.S. Pat. Nos. 2,528,203 to Zwosta; 2,714,914 to Champigny; 2,740,449 to Erving; 2,791,257 to Jacobson et al; 3,025,901 to Bengert; and 4,263,954 to Dwinell.

Another difficulty inherent not only in cable-type chains but link-type chains is that of installation by the average user. Proper mounting and adjustment of the chains to the desired tautness so as to properly function when installed have presented difficulties since the inception of the use of chains as auxiliary traction devices. Representative of the approach taken in the past are the hook end connectors as illustrated in the hereinbefore referred to U.S. Pat. No. 3,752,204 to Ouelette and U.S. Pat. No. 3,918,505 to Muller. In the latter, a wear link has been devised to facilitate interconnection of adjacent links in a chain to a common web-like member. Ouelette is directed more to the positioning of a retaining member which has an angled end at one end of the lateral or circumferentially extending wire and which is slotted in a manner to receive the opposite ends of the cable. Here, the desired tautness is obtained by positioning a series of stop elements or abutments along the other end of the wire which can be releasably positioned within the slotted portion of the retaining member. However, it is desirable to facilitate interconnection between the free ends of a lateral cable with a minimum of manipulation and in such a way that the ends will lie substantially flush along the tire wall and not cause any damage to the tire casing or sidewall.

SUMMARY OF THE INVENTION

It is therefore a principal and foremost object of the present invention to provide for a novel and improved traction device which is specifically adaptable for use with radial tires and which is characterized by possessing improved wear-resistance and traction and can be readily installed on a tire and adjusted to the desired tautness in a minimum amount of time.

Another object of the present invention is to provide for a novel and improved cable-type tire chain having cross members with outer surrounding rollers which serve as traction members across the tread portion of the tire and are characterized by their simplicity of construction, ease of assembly, and which demonstrate excellent impact and wear-resistance; and further wherein a novel and improved construction of the cross members minimizes any danger of damage to the tires or cables while increasing the traction of the tires with respect to the road surface.

It is a further object of the present invention to provide for a cable-type traction device having circumferentially extending cables provided with novel and improved connectors between opposite free ends of each cable which are adjustable, establish positive but releasable gripping engagement with the free ends and can be readily connected and disconnected.

It is an additional object of the present invention to provide in a traction device for a novel and improved connector for one end of a lateral wire or cable for direct, releasable connection of the other free end of the cable thereto in such a way as to effect positive attachment of the connectors to the cable ends without danger of splitting or separation of the cable ends under repeated use.

It is an additional object of the present invention to provide for a novel and improved traction device conformable for use with radial tires as well as bias laid tires having increased traction, wear, durability and strength.

In accordance with the present invention, a novel and improved traction device has been devised and which in the preferred form comprises a cable-type chain adapted to be mounted on radial tires for emergency use. Broadly, a pair of lateral cables are adapted to extend circumferentially along opposite sidewalls of the tire, and the improvement comprises a plurality of cross members which are arranged at spaced intervals for extension transversely of and between the lateral cables, opposite ends of each of the cross members being connected to the lateral cables, and each of the cross members being in the form of an elongated flexible tendon member composed of a wire or wire-like having an outer plastic or plastic-like coating molded around and into the tendon member; and at least one roller member is slidably disposed in outer surrounding relation to each of the cross members, the rollers being composed of a high impact-resistant material. Preferably, the rollers are in the form of a plurality of extruded tubular sections of limited length which are disposed in end-toend relation to one another for extension along the greater length of each cross member and particularly along the length of the cross member which traverses the tread portion of the tire.

Most desirably, each of the lateral or circumferentially extending cables is correspondingly made up of a plastic-coated, stranded wire, one end of each lateral cable having a connector affixed thereto. The connector is provided with wedging means in the form of a pair of closely spaced slots, each slot having an entrance portion and sidewalls converging away from the entrance portion. The opposite free end of each lateral cable is adapted for insertion by looping through the pair of entrance portions, then may be securely but adjustably fastened by spreading the free end of the cable into the convergent slots until the desired tautness is obtained. Stretching of the free end of the cable through the slots will increase the tendency of the cable to extend outwardly through the convergent sidewalls of the slots and advance the cable into snug-fitting engagement with the convergent sidewalls. The excess length of the free end of the cable extending beyond the connector may be suitably clipped in place to the connector end of the cable by means of a conventional clip or retainer.

A modified form of connector is specifically adaptable for use between the free ends of the lateral cable which extends circumferentially along the back or inner sidewall of the tire. In the modified form, the connector is in the form of a flat body portion having wedging means in the form of closely spaced slots with convergent sidewalls and closed entrances at relatively near ends of the slots. One free end of the cable is threaded or looped through the entrances, and the body portion has an opening at one end which is adapted to receive the hook end of a connector which is affixed to the opposite free end of the cable. Once the connector is assembled onto one end of the cable, it may be loosely hooked to the opposite end of the cable, and the desired tautness obtained by drawing the one end of the cable through the connector until it is snugly engaged within the slots as previously described with reference to the preferred form. The plastic-coated, stranded wire elements which make up the cross members afford a vastly improved manner and means of mounting the high impact-resistant rollers as well as for securing the cross members to the lateral cables. Similarly, the plastic-coated wire elements making up the lateral cables greatly facilitate attachment of the free ends of the cables in combination with the connector elements as described.

The above and other objects, advantages and features of the present invention will become more readily appreciated and understood from a consideration of the following detailed description of a preferred embodiment of the present invention when taken together with the accompanying drawings of a preferred embodiment of the present invention, in which:

BRIEF DESCRIPTION OF THE DRAWINGS

FIG. 1 is an elevational view of a preferred form of traction device mounted on a radial tire;

FIG. 2 is a plan view illustrating the preferred form of traction device preliminary to its mounting on a tire;

FIG. 3 is a view in more detail of the preferred form of connector employed between free ends of one of the cables while illustrating in more detail the mounting and disposition of the cross members with respect to one of the lateral cables;

FIG. 4 is an enlarged cross-sectional view of one of the cross members and outer roller mounted thereon;

FIG. 5 is an enlarged front view of the form of connector illustrated in FIG. 3;

FIG. 6 is a side view of the connector illustrated in FIG. 5;

FIG. 7 is a front view of a modified form of connector in accordance with the present invention; and FIG. 8 is a side view of the form of connector shown in FIG. 7.

DETAILED DESCRIPTION OF THE PREFERRED EMBODIMENT

Referring in more detail to the drawings, there is illustrated in FIGS. 1 and 2 the assembly of a traction device which is generally designated at 10 and which is broadly comprised of a pair of lateral cables 12, cross members 13 extending at spaced intervals between the lateral cables 12 and end connector assemblies for each lateral cable. Specifically, one end connector for a lateral cable 12 comprises a connector 14 affixed to one free end 15 of a lateral cable 12 which is adapted to extend along the outside of the tire for interconnection of the opposite free end 16 of that cable; another connector 18 is adjustably secured to a free end 19 of a lateral cable 12' adapted to extend along the inside or back of the tire and is adapted for connection to a complementary fastener 20 at opposite free end 21 of the cable 21'. The end connector 14 is illustrated in more detail in FIGS. 5 and 6, and the end connectors 18 and 20 are illustrated in more detail in FIGS. 7 and 8.

In the preferred form, the traction device 10 is specifically adapted to be mounted on a radial tire as represented at T with the lateral cables 12 and 12' extending circumferentially along opposite sidewalls S of the tire T. In turn, the cross members 13 are arranged for extension over the tread portion as represented at A in FIG. 1, opposite ends of the cross members being secured by conventional types of clips 22 to the lateral cables, and the cross members 13 preferably being arranged at uniformly spaced intervals along the length of the lateral cables. As illustrated in more detail in FIG. 4, each cross member has an inner generally cylindrical core composed of a multi-stranded wire 24 embedded impregnated in an outer plastic or plastic-like coating 25. Preferably, the coating 25 is a nylon composition, a preferred form of plastic-coated cable assembly being that manufactured and sold by Sanlo Manufacturing Co. of Michigan City, Ind. This particular form of cable is made up of 7"×7" helical strands of wire embedded within a nylon coating such that the outer diameter of the coating is just greater than twice the outer diameter of the inner strands of wire 24. A plurality of roller members 26 are slidably disposed on each of the cross members, each sleeve member 26 being in the form of a tubular section composed of a non-metallic, high impact-resistant material. A preferred composition of the sleeve members is a plastic material sold under the trademark "Zytel ST Super Tough Nylon Resin" manufactured and sold by DuPont Chemical Corporation. The sleeve members or rollers 26 are dimensioned such that a slight clearance or space exists between the external surface of the cross member 13 and inner surface of the rollers so that the rollers are independently rotatable and movable on each cross member. As best seen from FIG. 2, a sufficient number of roller members 26 are assembled onto each cross member in end-to-end relation as to occupy the greater length of each cross member and specifically to assure extension across the tread portion of the tire.

The connectors 22 at opposite ends of each cross member 13 are of conventional construction and typically may be made up of a generally hook-shaped end 30 which is crimped in place over the lateral cable or wire 12 or 12', and an opposite split circular end portion 32 is correspondingly crimped into tight-fitting engagement with the end of the cross member 13. Small openings 31 and 31' are formed in each connector 22 to permit the outer coating material to swell into the openings and establish a more positive connection.

In the preferred form, the sleeve members 26 are full cylindrical or tubular sections which are threaded onto each cross member as a preliminary to assembly of the cross members with respect to the lateral cables 12 and 12' in the manner described. Most importantly, however, the combined use of the non-metallic rigid roller members 26 and the pliable, plastic coated cross members 13, particularly in causing the outer coating material to flow at least to some extent in and around the wire strands, avoids any tendency of the rollers 26 or connectors 22 to cut or splice through the coating and separate it from the wire strands so as to greatly increase the strength and durability of the traction device.

Each of the lateral cables 12 and 12' is composed of multiple strands of wire 24 covered with a pliable or flexible but tough plastic coating 25 as illustrated in FIG. 4, which are formed in the same manner as the cross members 13. As illustrated in FIGS. 5 and 6, the end connector 14 preferably takes the form of a flat body portion 40 having a circular split end portion 41 adapted to be crimped onto the free end 15 of the cable 12, and a small opening 42 permits expansion of the coating material of the cable into the opening. A pair of longitudinally spaced slots 43 and 44 are formed in the body portion 40, each slot having a laterally directed entrance 45 with a slight radius or relief 45' and sidewalls 46 and 47 converging away from their respective entrances 45 and away from the end portion 41. The entrances 45 are located at one end of each slot relatively near the end portion 41, the slots being longitudinally spaced along the length of the body portion or, in other words, in a direction parallel to the length of the cable 12, and the slots 43 and 44 are separated by a common bridge 48 defined by the intermediate portion of the body 40. The entrances 45 open in a direction transversely of the length of the body portion and of the cable 12 so that the opposite free end 16 of the cable may be looped or passed laterally through the entrances in such a way that an intermediate portion 16' at the free cable end passes over the divider 48, and those cable portions extending away from the intermediate portion pass downwardly through the slots 43 and 44 and beneath opposite ends of the body portion 40. By grasping the terminal end or excess length of the cable which extends along or beneath the split end portion 41 of the body portion 40 and tightening the cable within the body portion, it will be apparent that increasing tension will urge the cable to draw more snugly into the convergent ends of the slots 43, 44 until the desired tautness is obtained, and the radius portions 45' will discourage any accidental sidewise or lateral movement of the cable through the entrances 45. In this way, any tendency of the free end 16 to become accidentally released from the slotted end connector 14 is resisted by the convergent sidewalls and particularly the convergent sidewalls of the slot 43. In effect, therefore, the free end 16 will become locked or positively lodged in place within the slots 43 and 44. As a result, a positive releasing action is required in order to release the free end 16 from the connector, such as, by lifting of the distal end of the body portion 40 away from the tire while forcing the free end inwardly or in the opposite direction away from the convergent sidewalls until it becomes aligned with one of the entrances 45 and can be removed by a sidewise movement of the connector or cable through the entrance 45. Once locked in position, it is desirable to secure the terminal end portion 16' of the free end 16 of the cable, such as, by conventional clips or retainers 50 which are of generally S-shaped configuration and have a curved end for insertion of each end of the cable as shown in FIGS. 5 and 6.

Another form of end connector is illustrated in FIGS. 7 and 8 and is specifically adapted for use in connecting opposite ends of the lateral cable 12' which is disposed behind or on the inner sidewall of the tire. In accordance with conventional practice, when the traction device is assembled onto a wheel or tire, the free ends of the inner cable 12' which extend circumferentially behind the tire are first interconnected as a preliminary to connection of the outer cable 12; and by virtue of the difficulty of access to the inner free ends, it is desirable that the amount or number of steps required in manipulating the free end connectors to secure a connection be reduced as much as possible yet permit adjustable interconnection between the free ends to the desired degree of tautness. For this purpose, the end connector 18 is formed in a manner very much similar to the end connector 14 in the respect that it comprises a flat body 51 with an expansion opening 52, the body also having a pair of slots 53 and 54 which are longitudinally spaced from one another, each slot being provided with convergent sidewalls 56 and 57 which converge away from a larger entrance end 58. The entrance ends 58 are separated by a solid portion or bridge 59 forming a part of the body portion. Additionally, the distal end of the body portion 51 is provided with a generally rectangular opening or aperture 60 adapted to receive the hook end of the connector 20 to be hereinafter described. From the foregoing, it will be noted that the end connector 18 differs from the end connector 14 principally in the respect that the entrance portions 58 do not open in a lateral or transverse direction to the side of the body portion; rather, the slots 53 and 54 are formed as closed slots since the end connector 18 is preassembled onto the one free end 19 of the cable simply by threading the terminal end of the cable through one entrance 58, looping over the intermediate or bridge portion 59 of the body, then passing back through the other entrance 58, as best seen from a consideration of FIG. 8. The effective length of the cable 12' can be regulated by passing the desired length of cable through the slots 53 and 54 and securing any excess length as at 19' by one or more clips 50.

The end connector 20 is comprised of a somewhat elongated body portion 61 having a generally circular end portion 62 at one end and a hook end portion 63 at the opposite end. The circular end 62 is sized for loose-fitting insertion over the terminal end 21' of the free end 21 of the lateral cable 12' and is then fixed in place by squeezing or otherwise crimping the split end portion 62 so as to permanently affix it to the cable. The opposite hook end portion 63 is sized to be of a width just less than that of the opening 60 in the end connector 18 and is provided with a reverse-curved or return end portion 64 which is doubled back over the intermediate portion of the body or plate 61, leaving a slight space or gap between the return end portion 64 and intermediate portion of the body just sufficient to permit the end of the body portion 51 to pass therebetween in securing the end connectors 18 and 20 together. Thus, in fastening the end connectors 18 and 20, since the end connector 18 is preassembled onto the free end 19, the only step required is to hook the end connector 20 with respect to the end of the body 18 to secure the lateral cable 12 behind the tire.

In practice, the traction device can be assembled onto a tire in the standard manner followed for any type of tire chain assembly. It can be most easily assembled with the motor vehicle jacked up so that the tires are readily accessible to permit each traction device to be placed over the tread portions of the tire with the lateral cable 12' extending circumferentially around the inner sidewall, the lateral cable 12 correspondingly extending around the outer sidewall, and the cross members 13 are arranged for extension over the tread portion of the tire, as illustrated in FIG. 1. Once the inner cable 12' has its free ends 19 and 21 interconnected as previously described, the free ends 15 and 16 of the outer cable are interconnected in the manner described with reference to FIGS. 5 and 6. In accordance with well-known practice, auxiliary tighteners or tensioning devices may be employed to draw the assembly into position as a preliminary to threading of the free end 16 of the cable through the end connector 14. Upon removal of the tightener, not shown, any stretching of the end connector 14 with respect to the free end 16 of the cable is resisted by the expansion of the cable into the convergent sidewalls 46 and 47 of each of the slots as described earlier. The particular form of end connector provided for the outer cable 12, by virtue of its being flat and aligned with the length of the cable 12 offers the additional advantage of pressing the cable snugly against the sidewall S so as to further resist any tendency of the cable to be accidentally released and avoid objectionable projection of the connector away from the tire.

It will be evident from the foregoing that the forms of end connectors described for the outer and inner cables 12 and 12', respectively, can be interchangeably used. In other words, either type of end connector may be used on both sides of the lateral cable. Nevertheless, for the reasons pointed out, each type of end connector offers particular advantages when used in combination and especially in combination with the plastic-coated cables which afford additional frictional resistance to accidental release of the ends of the cables from their connection to the end connectors.

From the foregoing, a traction device has been devised which offers distinct advancements in ease of installation or mounting on tires as well as improved wear resistance and impact resistance without unduly detracting from the comfort and rideability of a vehicle at moderate to higher speeds. For the purpose of illustration and not limitation, in the application of the present invention for automobile tires, the inner strand of wire making up the cross members 13 is a 7"×7" strand wrap having a 3/32" outside diameter; while the outer nylon coating is on the order of 3/16' outside diameter. Again, the preferred form of cross member 13 is composed of a 7"×7" strand wrap embedded impregnated by extrusion of an outer nylon resin coating under pressure into and around said strands of wire, as manufactured and sold by Sanlo Manufacturing Co. of Michigan City, Ind. Depending upon the flexibility desired and differences in tire sizes the number of strands may be suitably varied. Again, the cross member is formed by extruding the nylon coating under pressure so as to cause it to flow into and at least partially around all of the strands so as to form a unitary assembly. The notable advantage of this can be appreciated from the ability of the cable to resist separation between the coating and wire as it undergoes repeated flexing and is subjected to loading of the rollers 26 under highspeed travel; also, at the connecting end portions, the coated nylon resists any tendency to become split separated by virtue of the integration of the coating into the body of the strand of wire 24. The lateral or circumferential cables 12 and 12' may have a somewhat reduced total diameter with an outer coating on the order of ⅛" outside diameter and wire assembly on the order of 1/16" outer diameter. Again, the thickness of the coating should be equal to or greater than the wire size; or in other words, the diameter of the coating should be substantially twice the diameter of the wire so as to form a thick protective sheath around the wire and which is at least partially embedded impregnated into the wire strands so as to avoid any tendency to cut or separate the wire strands under repeated flexure and impact. The relative size and coating of the wire also assures firm connection at the ends of the cross members 13 as well as the ends of the lateral cables 12 and 12' to the end connectors. In this relation, most desirably the V-shaped slots for the end connectors, such as, slots 43 and 44 have convergent sidewalls which at their narrowest point are less than the diameter of the cable coating but greater than the diameter of the wire. In the formation of the slots, it is desirable that the edges be squared or straight so as to enable a positive bite or wedging action between the cables and sidewalls of the slots. This is aided to some extent by utilization of expansion openings which are strategically placed throughout the end connectors as described so as to lend further positive engagement between the connector and cable.

While a preferred form of traction device adapted for emergency use on radial tires has been described as well as the preferred composition and size of materials making up the traction device, it is to be understood that various modifications and changes may be made both in the material composition and relative size depending upon the specific application of the type of device to different sized tires or wheels. For instance, while Zytel has been selected as the preferred composition for the roller members, other metal or non-metallic rollers may be employed which possess the requisite impact resistance and strength. This may typically be aluminum, steel, hard rubber or rubber-like seals as well as other plastic or synthetic rubber materials. Similarly, the composition of the cable may be modified to some degree in the selection either of a stranded or braided wire in combination with an outer pliable or flexible coating made up of a plastic, rubber or rubber-like material having the desired flex and wear resistance.

It is therefore to be understood that various other modifications and changes may be made in the present invention without departing from the spirit and scope thereof as defined by the appended claims.

I claim:

1. In a traction device for vehicle tires wherein a pair of lateral cables are adapted to extend circumferentially along opposite sidewalls of a tire, the improvement comprising:

a plurality of cross members arranged at spaced intervals for extension transversely of and between said lateral cables, opposite ends of each of said cross members connected to said lateral cables, each of said cross members including an elongated flexible tendon member and an outer protective sheath composed of a non-metallic pliable material in which said elongated flexible tendon member is impregnated to define a unitary cross member, and a plurality of impact-resistant roller means rotatably and slidably disposed in outer spaced surrounding relation to each sheath whereby when said traction device is mounted upon a vehicle tire and said vehicle tire is under rotation, said impact-resistant roller means are slidable under centrifugal force away from said opposite ends of said cross member for extension across the tread portion of said vehicle tire.

2. In a traction device according to claim 1, said roller means formed of a plurality of tubular sections of limited length with respect to the length of each said cross member and disposed in end-to-end relation to one another for extension along the greater length of each cross member.

3. In a traction device according to claim 2, each of said roller means composed of a non-metallic, high impact-resistant material.

4. In a traction device according to claim 3, said roller means composed of an inflexible nylon material.

5. In a traction device according to claim 1, said cross members and said lateral cables each comprised of stranded wires encased in said sheath, said sheath composed of a flexible material, and said roller means defined by a plurality of tubular sections slidably mounted on each of said sheaths and in surrounding relation thereto.

6. In a traction device for vehicle tires wherein a pair of lateral cables are adapted to extend circumferentially along opposite sidewalls of a tire, the improvement comprising:

a plurality of cross members arranged at spaced intervals for extension transversely of and between said lateral cables, opposite ends of each of said cross members connected to said lateral cables, each of said cross members defined by an elongated flexible member composed of multiple strands and a protective sheath formed of a pliable material and disposed in surrounding relation to said elongated flexible member and at least partially embedded into said flexible member between said multiple strands, a plurality of high impact-resistant, inflexible roller elements journaled in outer surrounding relation to each of said cross members, and adjustable end connectors adapted to interconnect opposite free ends of each of said lateral cables in assembled relation to a tire.

7. In a traction device according to claim 6, each of said high impact-resistant elements being of limited length and in the form of an extruded tubular section, said tubular sections disposed in end-to-end relation to one another on each of said cross members and adapted for extension across the tread portion of a tire.

8. In a traction device according to claim 6, said cross members comprised of stranded wires encased in said sheath, said sheath composed of a plastic coating united with and at least partially embedded into and between said stranded wires, and said outer impact-resistant elements for each cross member defined by a plurality of tubular sections journaled in outer spaced surrounding relation to said cross members so as to extend the greater length of each cross member.

9. A traction device adapted for mounting on a tire comprising in combination:

a pair of elongated flexible cable members adapted to extend circumferentially of opposite sidewalls of a tire, each cable member having an outer protective covering of a flexible plastic material and having opposite free ends adapted for releasable connection to one another;

a plurality of flexible cross members each having opposite ends connected to said elongated flexible cable members at spaced circumferential intervals therealong, said cross members adapted to traverse the tread portion of the tire when said elongated flexible cable members are disposed along the opposite sidewalls of said tire; and an end connector affixed to one free end of each said elongated flexible cable member and adapted for connection to an opposite free end of each said flexible cable member, each end connector provided with wedging means defined by a plate having a pair of spaced slots therein for releasable wedging engagement with said opposite free end when said opposite free end is inserted through said spaced slots and tension is applied to its associated elongated flexible member to effect positive but releasable wedged engagement between said opposite free end and said end connector.

10. A traction device according to claim 9, said pair of slots in each plate spaced in the direction of the length of said cable members, each slot in one of said plates provided with an entrance opening through the side of said plate in a direction transversely of the length of its cable member so as to form a pair of open slots in said connector.

11. A traction device according to claim 10, said one pair of slots having sidewalls converging in the same direction and terminating in a convergent end of a width lass than the diameter of opposite free end of said cable member adapted for insertion therein, and the entrances of said one pair of slots being formed at wider ends thereof.

12. A traction device according to claim 9, said connector having a relatively flat body in which each slot in one of said plates is generally V-shaped with wider ends relatively near the point of connection of said connector and narrower ends of said slots sized to be of a width less than the diameter of said opposite free end of said cable member inserted therein.

13. A traction device according to claim 12, each of said cable members having an external flexible coating and strands of wire embedded in and surrounded by said coating.

14. A traction device according to claim 9, each elongated flexible cable member having at least one free end defined by a tendon member embedded in said outer protective covering, said spaced slots having at least one convergent slot into which said opposite free end of said cable is inserted.

15. A traction device according to claim 9, a first of said end connectors having a pair of spaced, oppositely directed, closed slots converging in opposite lengthwise directions away from one another for insertion of said opposite free end of said elongated flexible member into wedging engagement with said slots, and a second of said end connectors for the other of said elongated flexible members having a pair of spaced slots converging in the same direction with transverse entrance portions at wider ends of said slots to permit lateral insertion of said opposite free end of the other of said elongated flexible member into wedging engagement with said slots.

16. A traction device according to claim 15, said first end connector having a fastener-engaging portion thereon, and said opposite free end of said one elongated flexible member to which said first end connector is connected having a fastener therein for releasable connection to said fastener-engaging portion.

17. A traction device according to claim 16, said second end connector including means for attaching said second end connector to said one free end of said elongated flexible member such that said wedging means extends in a direction toward said opposite free end of said first elongated flexible member.

18. A traction device according to claim 9, each of said end connectors having a flat body portion with said wedging means defined by a pair of slots provided with generally V-shaped sidewalls converging away from an entrance portion into each said slot, and a bridge portion separating said slots.

19. A cable type chain adapted to be mounted for emergency use on a radial tire comprising in combination:
- a pair of elongated flexible cable members each provided with an outer protective coating composed of a flexible plastic material, said flexible members adapted to extend circumferentially along opposite sidewalls of a tire, and each flexible member having opposite free ends adapted for releasable connection to one another;
- a plurality of flexible cross members in the form of cables extending at uniformly spaced circumferential intervals transversely between said elongated circumferentially extending cables and having means at opposite ends of said cross members connecting said opposite ends to said circumferentially extending cables, each of said cross members having an outer protective coating composed of a flexible plastic material, and a plurality of inflexible roller members extending in end-to-end relation to one another in outer spaced surrounding relation to each of said cross members, each of said sleeve members composed of an impact-resistant material; and
- end connector means operative to releasably interconnect opposite free ends of each of said elongated flexible cable members and means for securing said end connector means to one free end of said cable member, each of said end connector means provided with wedging means defined by a body portion having a pair of spaced convergent slots therein for adjustable insertion of the opposite free end of each flexible cable member through said slots to establish a predetermined effective length of each respective flexible cable member to the desired degree of tautness on said tire whereby application of tension to each respective flexible cable member will effect positive but releasable gripping engagement between said one free end of said flexible cable and said end connector means.

20. A cable type chain according to claim 19, each said cable comprised of inner stranded, spirally extending wires having an outer protective coating in which said wires are embedded and each of said sleeve members composed of a nylon material.

21. A cable type chain according to claim 20, said outer protective coating being on the order of twice the diameter of said inner stranded wires.

22. A cable type chain according to claim 19, said elongated flexible cable members having an outside diameter on the order of one-half the outside diameter of said flexible cross members.

* * * * *